United States Patent [19]

Miller et al.

[11] 4,379,624
[45] Apr. 12, 1983

[54] LASER BEAM STEERING DEVICE

[75] Inventors: Samuel A. Miller; Larry L. Jeffris, both of Ridgecrest, Calif.

[73] Assignee: The United States of America as represented by the Secretary of the Navy, Washington, D.C.

[21] Appl. No.: 253,417

[22] Filed: Apr. 13, 1981

[51] Int. Cl.³ ............................................. G02B 27/17
[52] U.S. Cl. .................................... 350/486; 350/6.6
[58] Field of Search ..................... 350/6.5, 6.6, 486; 356/400

[56] References Cited

U.S. PATENT DOCUMENTS

| | | | |
|---|---|---|---|
| 3,493,282 | 2/1970 | Rolon | 350/7 |
| 3,581,231 | 5/1971 | Freiberg | 331/94.5 |
| 3,628,175 | 12/1971 | Rigden | 331/94.5 |
| 3,814,507 | 6/1974 | Osborn et al. | 350/285 |
| 3,865,491 | 2/1975 | Hogan | 356/400 X |
| 3,866,032 | 2/1975 | Veres | 350/486 X |
| 3,874,778 | 4/1975 | Kato et al. | 350/7 |
| 3,876,309 | 4/1975 | Zicaro et al. | 356/153 |
| 3,892,475 | 7/1975 | Bardocz | 350/285 |
| 4,035,084 | 7/1977 | Ramsay | 356/400 X |
| 4,073,567 | 2/1978 | Lakerveld et al. | 350/6.5 |

Primary Examiner—F. L. Evans
Attorney, Agent, or Firm—R. F. Beers; W. Thom Skeer; Kenneth G. Pritchard

[57] ABSTRACT

A laser beam steering device is made of dual concentric apertured shafts which permit the laser beam to pass through them to a reflecting mirror. The mirror is driven in azimuth and elevation by the shafts. The device can be used with any laser beam and does not require a laser to be physically incorporated to the device.

5 Claims, 3 Drawing Figures

CAM PROFILE

LASER BEAM STEERING DEVICE

BACKGROUND OF THE INVENTION

1. Field of the Invention

The present invention is for laser beam steering devices. Specifically, the present invention is for a two axis laser beam steering mechanism which does not require a gimbal system.

2. Description of the Prior Art

Previous directing of laser beams has been done in one of two ways. The first way requires the laser to be mounted inside a mechanism which positions the entire laser. The second method has the laser beam directed into an optical mechanical device which alters the direction by reflection, refraction or a combination of both.

A typical application of the first method is distance measuring equipment for land surveying. Examples of such devices are U.S. Pat. Nos. 3,876,309 to Zicaro et al. and 3,892,475 to Bardocz. Implementations using this approach tend to be large and bulky because they have to support and position the entire lasing device or major portions of it. The positioning device must be at least a two gimbal servo system. Each gimbal requires its own actuator, position feedback device and electronic circuitry to implement effective control.

The second approach moves the laser off of the gimbal structure. This results in a smaller system, but still requires the major components of a two gimbal servo keeping the complexity and cost of the device at high levels. The second approach is frequently found in laser seekers for laser guided weapons.

SUMMARY OF THE INVENTION

A housing with an apertured opening permits an incident laser beam to enter the housing. The laser beam within the housing will travel a path which is contained along the axis of a shaft. The shaft rotates about the laser beam without interfering with the laser beam. A second shaft concentric to the laser beam axis rotates about the first shaft forming an inner and outer shaft pair. Upon exiting from the shaft, the laser beam reflects from a mirror surface and passes through a window in the housing. The mirror surface is attached to a cam follower and mounted to one of the shafts. The second shaft is mounted to a cam which supports the cam follower. The mirror can be moved in either the azimuth or elevation directions. Rotation of a cam by one shaft will change the orientation of the mirror surface as it intersects the laser path. Changing the angle of intersection changes the angle of incidence and therefore the angle of reflection. If the cam follower shaft with the mirror mounted to it is rotated with the shaft attached to the cam, the angle of incidence of the laser beam on the mirror surface will not change. The mirror surface rotates about the axis of the laser beam, changing the azimuthal direction that the laser beam travels upon reflection from the mirror surface. To permit detailed control of the laser beam in these two directions, each shaft has an encoder disk attached to it which is fed to an encoder read head for each shaft. The read heads permit the shaft orientations to be electronically controlled to precise settings.

It is an object of the present invention to provide a compact two directional steering apparatus for a laser system which does not require an included laser system. It is a further object of the invention to provide a relatively lightweight compact two directional steering apparatus for a light beam without use of a gimballed apparatus.

DESCRIPTION OF THE PREFERRED EMBODIMENT

Figure 1:
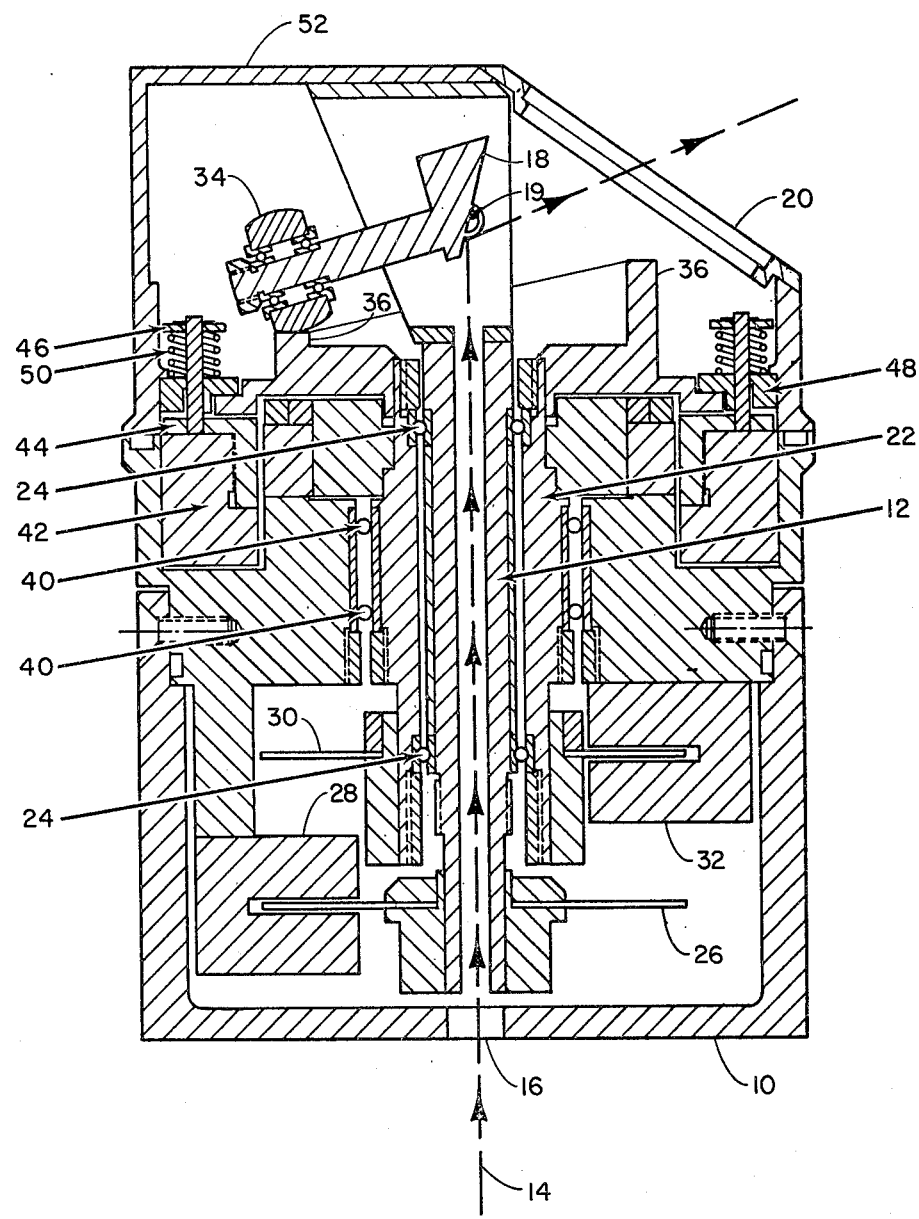
FIG. 1 is a cutaway section of the present invention.

FIG. 1 shows a housing 10. Within housing 10, there is an apertured inner shaft 12. Inner shaft 12 is placed within housing 10 so that an incident laser beam 14 from a laser, not shown, can enter housing 10 through opening 16 and travel the length of inner shaft 12 along the path indicated by the arrows without interacting with inner shaft 12. Upon exiting inner shaft 12, laser beam 14 strikes a mirror surface 18 and reflects through a window 20 which is transparent to laser beam 14. An outer shaft 22 is concentrically located about laser beam 14 and inner shaft 12 as shown. Inner shaft 12 and outer shaft 22 are separated by support bearings 24.

Inner shaft 12 has a position encoder disk 26 attached to it. Inner shaft position encoder disk 26 is coded to uniquely determine the different orientations possible for inner shaft 12. An inner shaft encoder read head 28 is positioned to read the coding on position encoder disk 26 to electronically determine the orientation of inner shaft 12. Position encoder disk 26 and encoder read head 28 serve as a means for determining the orientation of inner shaft 12. Numerous other devices can be used to accomplish the same determination of inner shaft 12's orientation. A similar position encoder disk 30 and encoder read head 32 combination are associated with outer shaft 22. Once again position encoder disk 30 and encoder read head 32 merely serve as a means to monitor the orientation of outer shaft 22 in a similar fashion to that for inner shaft 12.

Mirror surface 18 is pivoted at point 19 about a cam follower 34. A cam 36 is rigidly attached to outer shaft 22. Mirror 18 is spring loaded to push against cam 36 and does not rely on gravity. Cam 36 drives cam follower 34. As shown in FIG. 1, cam 36 has a high and low side which is joined by a uniform taper. Rotation of outer shaft 22 causes cam 36 to rotate with it. This in turn forces cam follower 34 to pivot mirror surface 18. The pivoting of mirror surface 18 changes the angle of incidence from laser beam 14. Changing the angle of incidence causes the reflection angle to change. The change in reflection angle changes the angle of elevation of laser beam 14 as it exits window 20. As the mirror pivots, the reflected laser beam direction changes in elevation by twice the angular movement of the mirror. As shown in FIG. 1, mirror surface 18 is shown in cross section. The mirror support and pivot are represented by cam follower 34 and are rigidly attached to inner shaft 12. Thus, if inner shaft 12 rotates at the same time as outer shaft 22, the respective position of cam follower 34 to cam 36 will be unchanged and mirror surface 18 will slew in azimuth at a constant elevation angle.

Figure 2:
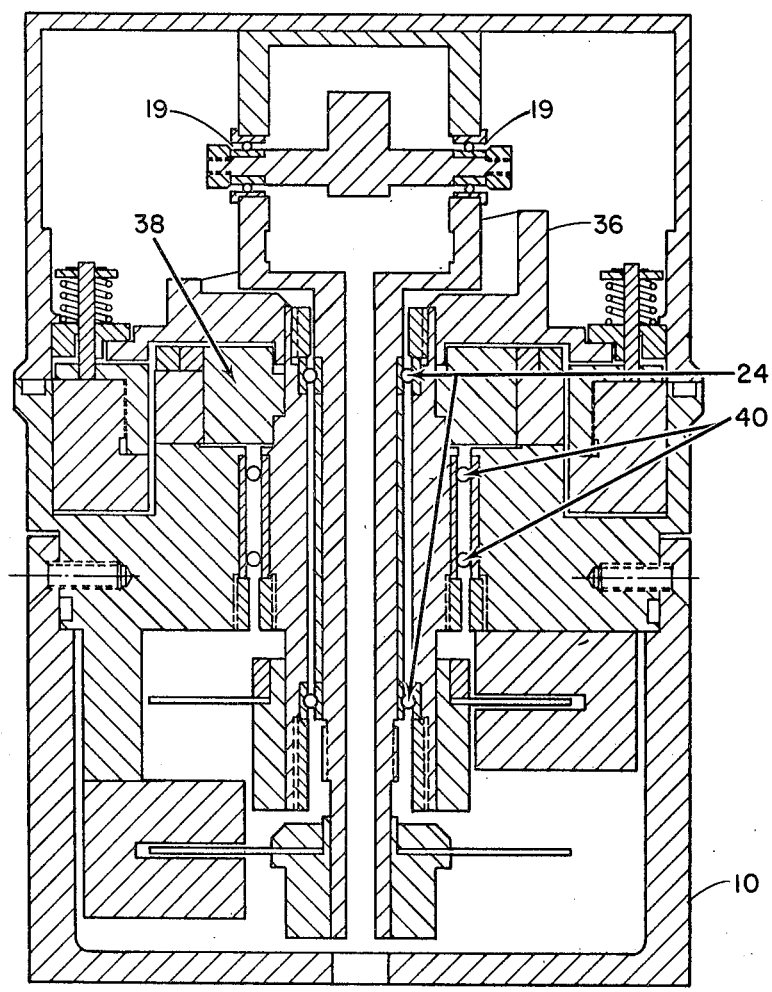
FIG. 2 is a cutaway of the present invention with one shaft rotated to change the orientation of the mirror used for beam deflection of the present invention.

FIG. 2 shows a torque motor 38 connected to outer shaft 22. Outer shaft 22 is separated from housing 10 by support bearings 40. A combination of support bearings 40 for outer shaft 22 and support bearings 24 between inner shaft 12 and outer shaft 22 permit each shaft to rotate independently of housing 10.

To determine whether inner shaft 12 and outer shaft 22 rotate independently or jointly, a clutch assembly is used. The clutch assembly has a clutch coil 42 positioned around the concentric shaft arrangement as shown. When clutch coil 42 is deenergized, inner shaft 12 and outer shaft 22 are locked rigidly together and must rotate as a unit. When torque motor 38 is activated, it rotates both inner shaft 12 and outer shaft 22 and causes the direction of the reflected laser beam to change in azimuth while its elevation angle remains fixed. When clutch coil 42 is energized, the clutch locks inner shaft 12 to housing 10 so that it cannot rotate. Activation of torque motor 38 now rotates only outer shaft 22 and its attached assembly. This causes the relative positions of inner shaft 12 and outer shaft 22 to change. This change causes cam follower 34 to ride up or down the surface of cam 36, which in turn causes the mirror tilt of mirror surface 18 to vary. With the clutch energized, torque motor 38 changes the elevation angle of the reflected laser beam 14 while the azimuth angle remains fixed. Torque motor 38 will drive either the azimuth or the elevation angle of the reflected beam depending on whether clutch coil 42 is deenergized or energized respectively.

The clutch assembly operates in the following manner. Clutch coil 42 is an electrical solenoid wound around the cylindrical axis of the walls of housing 10 and comprises an electromagnet. A clutch plate 44 is made of magnetic material and is attracted to clutch coil 42 when clutch coil 42 is energized, has current flowing through it. Clutch plate 44 has four vertical pins 46 fixed to it which pass upward through four corresponding holes in a carrier plate 48. Carrier plate 48 is rigidly attached to a dome 52 and to inner shaft 12 assembly. Clutch plate 44 rotates with inner shaft 12, but can move up and down a small distance under the influence of clutch coil 42 and clutch springs 50. Clutch springs 50 keep vertical pins 46 above carrier plate 48 unless clutch coil 42 is energized. Clutch springs 50 are arranged on four vertical pins 46 as shown and hold the clutch plate in its extreme upward position when clutch coil 42 is deenergized. This causes the top face of clutch plate 44 to bear against the under side of cam 36. The resulting frictional forces lock the inner and outer shaft assemblies together. When clutch coil 42 is energized, magnetic forces pull clutch plate 44 down onto the top surface of clutch coil 42. When this happens, clutch plate 44 is pulled away from cam 36 so that the outer shaft 22 is free to rotate under the influence of torque motor 38.

On top of housing 10, dome 52 is mounted with a window 20. Dome 52 is rigidly attached to inner shaft 12 via carrier plate 48 and thus rotates with it. When inner shaft 12 rotates, it causes mirror surface 18 to rotate and dome 52 also rotates such that window 20 always permits transmittance of laser beam 14 through window 20.

The position of inner shaft 12 and thus the azimuthal position of the reflected beam is determined directly by signals developed by inner shaft position encoder disk 26 and its associated read head 28. Similarly, the position of outer shaft 22 is determined by the signals derived from the outer shaft position encoder disk 30 and its associated read head 32. The tilt of the mirror is relative motion between the inner and outer shaft assemblies. Therefore, the elevation of the reflected beam is a function of the difference between the signals derived from the two position encoders. Control of the reflected beam direction is implemented by a suitably designed electronic controller, not shown. This controller reads and decodes the angular positions of the inner and outer shaft assemblies and applies voltages and currents to clutch coil 42 and torque motor 38 as appropriate.

The coaxial arrangement of all the major components allows the device to be fabricated in an extremely small and compact configuration. A single torque motor drives both the azimuth and elevation axis in a time shared fashion. A single motor requires only a single electronic control loop which is switched back and forth between the two axes via the clutch assembly. This reduces the number of components, the weight, the power consumption, and enhances the small size.

The foregoing discusses the use of shaft position encoder disks. These devices are intended to be digital shaft angle encoders of the optical type. However, it is not necessary to use these particular devices. Other devices which can be used are AC resolvers, resistive potentiometers or any transducer which converts angular position into a usable signal.

FIG. 2 shows a similar cutaway view where like numbers refer to like components. In FIG. 2, inner shaft 12, mirror surface 18 and dome 52 have been rotated. The orientation shown in FIG. 2 has mirror surface 18 facing out of the paper. Window 20 is in the section of dome 52 which has been cut away. The reflected direction of laser beam 14 in FIG. 2 is off of mirror surface 18 and out of the paper.

Figure 3:
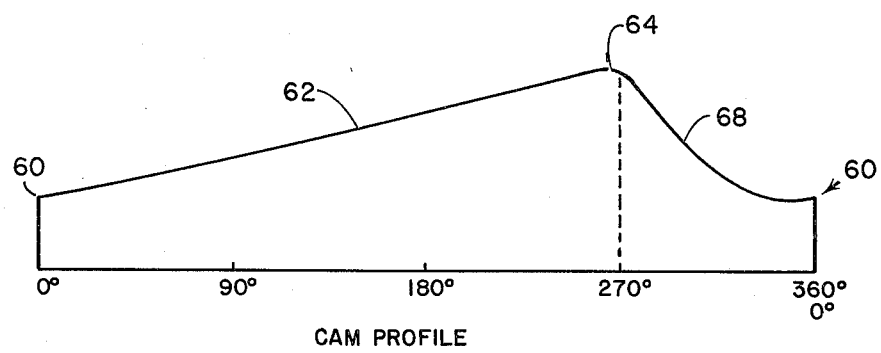
FIG. 3 is a profile of the cam used in the present invention.

FIG. 3 shows a profile of cam 36. Cam 36 has its lowest point at 0°. From 0° to 270°, there is a linear taper 62 to high point 64. This is followed by a smooth transition section 68 which retains the cam to low point 60.

In view of the above discussion, it is obvious that numerous modifications or alternate refinements can be made to produce a similar functioning device.

What is claimed is:

1. A laser beam steering mechanism for azimuth and elevation direction control of an incident laser beam comprising:
- an inner shaft with an aperture the length of its axis, said axis aligned with said incident laser beam to permit direct passage of said incident laser beam;
- an outer shaft concentrically mounted around said inner shaft for providing a dual rotational axis around said incident laser beam;
- a pivoted mirror rigidly attached to said inner shaft for deflecting said incident laser beam after it has passed through said inner shaft aperture, said mirror reflecting said beam in a given azimuthal direction determined by the rotation of said inner shaft;
- means for determining the orientation of said inner shaft;
- means for monitoring the orientation of said outer shaft;
- a cam attached to said outer shaft for changing the elevation of said mirror;
- a cam follower connected to said mirror and set to the azimuthal position of said inner shaft for following said cam;
- a torque motor set against said outer shaft for rotating said inner shaft;

a clutch assembly mounted to said outer shaft for coupling said inner shaft to the motion of said outer shaft at selected times, said inner and outer shaft either can be turned together or only said outer shaft turns; and a dome with at least one window mounted to said inner shaft for transmitting said reflected laser beam despite rotation of said inner shaft.

2. A laser beam steering mechanism for azimuth and elevation direction control of an incident laser beam as described in claim 1 where said inner shaft orientation determining means comprises:

a position encoder disk rigidly attached to said inner shaft for uniquely identifying the orientation of said inner shaft; and an encoder read head positioned to monitor said inner shaft position encoder disk for knowing the orientation of said inner shaft at all times.

3. A laser beam steering mechanism for azimuth and elevation direction control of an incident laser beam as described in claim 1 where said outer shaft orientation determining means comprises:

a position encoder disk rigidly attached to said outer shaft for uniquely marking each orientation of said outer shaft; and an encoder read head placed to read said outer shaft position encoder disk for identifying the orientation of said outer shaft at all times.

4. A laser beam steering mechanism for azimuth and elevation direction control of an incident laser beam as described in claim 2 where said outer shaft orientation determining means comprises:

a position encoder disk rigidly attached to said outer shaft for uniquely marking each orientation of said outer shaft; and an encoder read head placed to read said outer shaft position encoder disk for identifying the orientation of said outer shaft at all times.

5. A laser beam steering mechanism for azimuth and elevation direction control of an incident laser beam as described in any of claims 1, 2, 3, or 4 where said clutch assembly comprises:

a clutch coil for locking said inner shaft to said outer shaft, said clutch coil mounted to said inner shaft and placed against said outer shaft such that said outer shaft must rotate with said inner shaft unless said clutch coil is disengaged;

a clutch plate rigidly connected between said inner shaft and dome for rotating said dome with said inner shaft, said clutch plate in proximity to said clutch coil; and at least one clutch spring mounted to keep said clutch plate from said clutch coil unless said clutch coil is activated for mating the movement of said inner shaft to said outer shaft at selected times.

* * * * *